UNITED STATES PATENT OFFICE.

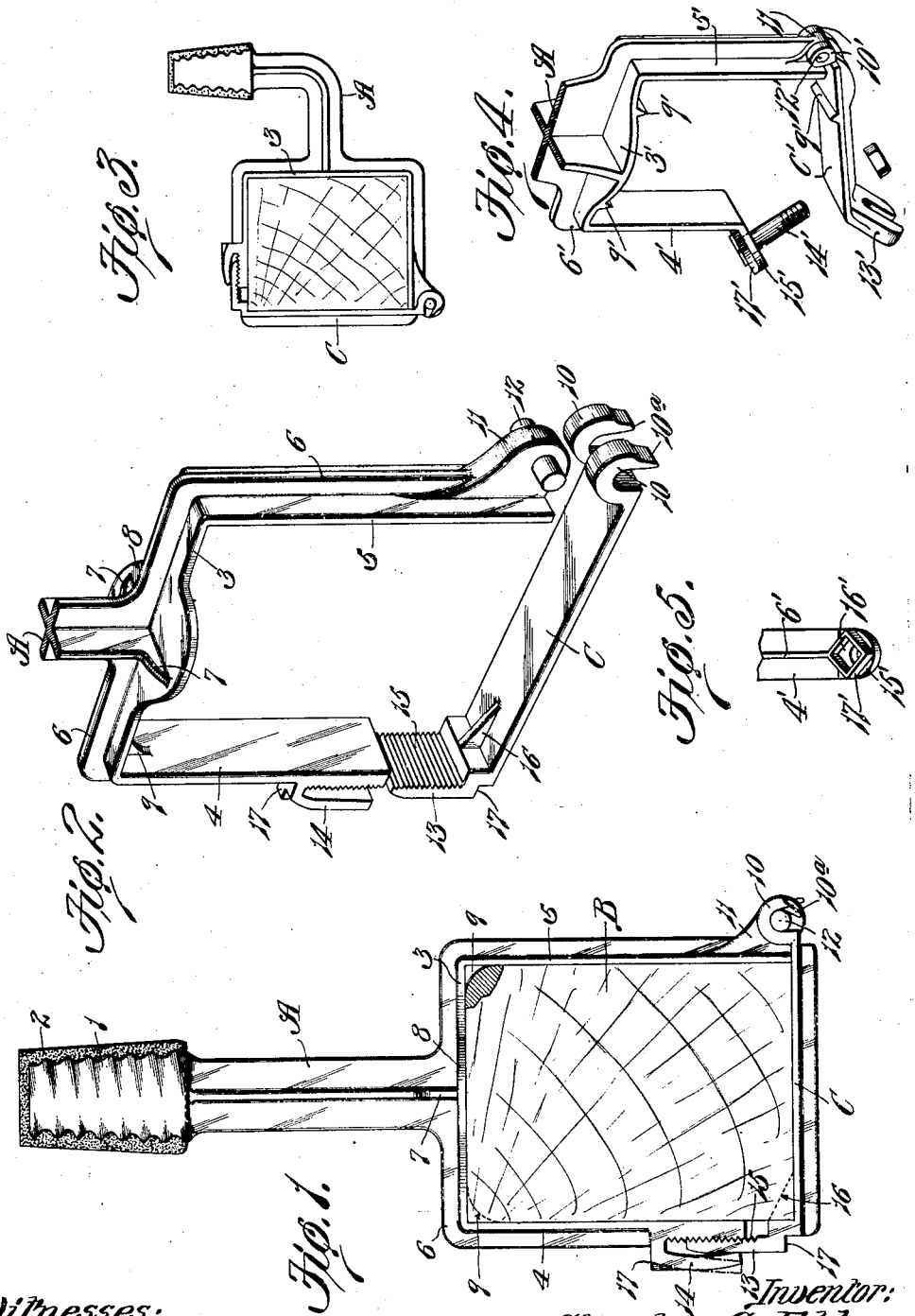

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

INSULATOR-BRACKET.

1,000,389.

Specification of Letters Patent. Patented Aug. 15, 1911.

Application filed August 31, 1910. Serial No. 579,939.

*To all whom it may concern:*

Be it known that I, CHARLES G. ETTE, a citizen of the United States, residing at St. Louis, Missouri, have invented a certain new and useful Improvement in Insulator-Brackets, of which the following is a full, clear, and exact description, such as will enable others skilled in the art to which it appertains to make and use the same.

This invention relates to insulator brackets, and particularly to brackets of that type which are used on pole cross arms.

The main object of my invention is to provide a bracket of simple construction that can be connected to a cross arm quickly and without the aid of fastening devices that pass through the cross arm.

Other objects and desirable features of my invention will be hereinafter pointed out.

Figure 1 is an elevational view of an insulator bracket constructed in accordance with my invention, said bracket being arranged in operative position on a pole cross arm; Fig. 2 is a perspective view of said bracket; Fig. 3 is an elevational view of a bracket of slightly different form from that shown in Fig. 1; and Figs. 4 and 5 are perspective views of still another form of my invention.

Referring to Figs. 1 to 3 of the drawings which illustrate one form of my invention, A designates the shank of the bracket, and 1 designates the head on said shank which supports the insulator, not shown. I have herein shown the shank 1 as being provided with an integral head having a piece of expansible material 2 arranged in the slot therein, but it will, of course, be understood that the shank could be provided with a removable head, or a head of any other preferred design, without departing from the spirit of my invention.

The shank A is provided at its lower end with a yoke that is adapted to embrace a pole cross arm B, as shown in Fig. 1, said yoke consisting of a horizontally disposed portion 3 that bears upon the top face of the cross arm, and depending vertically disposed portions 4 and 5 that embrace the side faces of the cross arm. The bracket is preferably formed of cast metal, such, for example, as malleable iron, and the yoke which embraces the cross arm is integrally connected to the shank A that carries the insulator. In the construction herein shown the shank A is of approximately cruciform shape in cross section, and the yoke is provided on its outer surface with vertical strengthening ribs or flanges 6 that merge into two of the flanges or wings of the shank A. The other two wings or flanges of said shank have their lower ends flared outwardly at 7, as shown in Fig. 2, and the top portion 3 of the yoke is provided at approximately its center with a comparatively wide portion 8 that insures a substantial bearing for the yoke on the cross arm and thus overcomes any tendency of the bracket to tip longitudinally of the cross arm. Triangular-shaped webs 9 are arranged on the inner side of the bracket at the junction of the horizontally disposed top portion 3 and the side portions 4 and 5 so as to reinforce and strengthen the yoke and also provide teeth or projections which sink into the upper corners of the cross arm when the bracket is arranged in position. These webs 9 operate to temporarily hold the bracket in position while the permanent means is being fastened and they also reduce the liability of the bracket to tip longitudinally of the cross arm.

The permanent securing means which locks the bracket in position on the cross arm consists of a hinged member or strap C that extends across the under side of the cross arm, as shown in Fig. 1. One end of this strap is pivotally connected to one of the side pieces of the yoke, and the opposite side of said strap is provided with a locking device that coöperates with a locking device on the other side piece of the yoke. The strap C can be connected to the yoke in various ways but I prefer to provide one end of the strap with a pair of hooks 10 that are spaced away from each other slightly so that they will straddle a laterally projecting lug 11 on the side piece 5 of the yoke, and also hook over or surround a cross pin 12 carried by said lug. The end portions 10$^a$ of said hooks are reduced in thickness slightly so that they can be bent after they have been hooked over the pin 12 and thus prevent the strap from becoming detached from the yoke. On the opposite end of the strap C is an upwardly projecting locking device or wing 13 that is adapted to project into a jaw formed by the side piece 4 of the yoke and a guard member 14 that projects laterally from said side piece, as shown in Fig. 2, the inner face of said wing 13 and the outer face of said side piece 4 being provided with coöperating teeth or serrations 15 that mesh with each other and thus retain the strap C in position. The strap C is preferably provided adjacent its free end with a tapered web 16 that sinks into the cross arm when the strap is moved into its closed position, and, if desired, the wing 13 and the guard 14 can be provided with square corners or shoulders 17 so as to enable the operator to grasp said shoulders with a pair of pliers and thus draw the strap C tightly against the cross arm.

In arranging the bracket in position, the operator first slips the yoke over the cross arm and strikes the top portion 3 of said yoke a blow so as to force the webs 9 into the cross arm. He then moves the strap C into its closed position and strikes it a blow to sink the tapered rib 16 into the under side of the cross arm. The locking wing 13 will now be arranged opposite the serrated portion of the side piece 4 of the yoke, and the operator then strikes the guard member 14 a blow so as to force it inwardly from the position shown in dotted lines in Fig. 1 into the position shown in full lines so as to force the teeth 15 on said locking wing into intimate engagement with the coöperating teeth on the side piece 4 of the yoke.

From the foregoing it will be seen that no fastening devices which pass through the cross arm are needed to retain the bracket in position; nor are any threaded fastening devices, such as bolts, used for connecting the bracket to the cross arm. Consequently, the bracket can be arranged in position quickly because it comprises practically only two parts; namely, the yoke and the strap, and it can also be removed quickly by merely bending the guard member 14 outwardly, as shown in dotted lines in Fig. 1, so as to permit the toothed wing 13 to be disengaged from the coöperating teeth on the side piece of the yoke. The device can be manufactured at an extremely low cost because it requires no machine work and comprises only two parts which are connected together by bending the reduced portions 10ª of the hooks 10 so that the hooks cannot slip off the pin 12.

It will, of course, be obvious that it is immaterial, so far as my broad idea is concerned, whether the shank A projects upwardly from the yoke or laterally therefrom, and it is also immaterial whether the strap C extends across the under side of the cross arm B or over one of the side faces of said cross arm.

In Fig. 3 I have illustrated a bracket of slightly different construction in which the strap C extends across one of the side faces of the cross arm, and the shank which carries the insulator projects laterally from the portion of the yoke that extends parallel to the hinged strap.

I have also illustrated still another form of my invention in Figs. 4 and 5 wherein the pivotally mounted strap C' that extends across the open side of the yoke is locked to the yoke by means of a bolt or other suitable fastening device that passes through said strap and one of the side pieces of the yoke. As shown clearly in Fig. 4, the strap C' is provided at one end with a pair of ears 10' which embrace an ear 11' on the side piece 5' of the yoke and a rivet or pin 12' passes through said ears so as to permanently connect one end of the strap to the yoke. The opposite end of the strap C' is provided with a bifurcated jaw 13' that receives a bolt or other suitable fastening device 14' which passes through a laterally projecting lug 15' on the side piece 4' of the yoke, and said lug is provided with a pocket 16' for receiving the head of the bolt so as to prevent the bolt from turning when the nut thereon is tightened, said pocket being preferably formed by a raised rib 17' which merges into the strengthening rib 6' that extends longitudinally of the side piece 4' of the yoke. The jaw 13' on the strap C' lies at an angle to said strap and the lug 15' lies at an angle to the side piece 4' of the yoke, said lug and jaw lying approximately parallel to each other so that the bolt 14' will be arranged at approximately right angles to the coöperating parts through which it passes. The cross web or upper portion 3' of the yoke is provided on its under side with transversely extending ribs or teeth 9' which sink into the top face of the cross arm on which the bracket is mounted, and the strap C' is provided with a transversely extending tooth or rib 9' that sinks into the under side of the cross arm when the strap is locked in operative position.

Having thus described my invention, what I claim as new and desire to secure by Letters Patent is:

1. An insulator bracket comprising an approximately yoke-shaped member having the central portion of its cross web widened so as to afford a substantial bearing for said member on the support which it embraces, means on said member for carrying the insulator, and a hinged or pivotally mounted strap that closes the open side of said member.

2. An insulator bracket comprising a yoke-shaped member that is adapted to embrace a support, means on said member for supporting an insulator, a strap extending across the open side of the yoke, a horizontally arranged pivot passing through portions of said yoke and strap for permanently connecting one end of the strap to said yoke, and perforated portions on said yoke and strap which are adapted to receive a removable fastening device.

3. An insulator bracket provided with an approximately yoke-shaped member that is adapted to embrace a support which carries the bracket, means on said member for supporting an insulator, a strap extending across the open side of said yoke-shaped member, a horizontally disposed pivot passing through said strap and one leg of said member for connecting the strap thereto, and a removable fastening device passing through the opposite end of said strap and through the other leg of said yoke-shaped member.

4. An insulator bracket consisting of a yoke that is adapted to embrace a support, means on said yoke for supporting an insulator, a strap extending across the open side of the yoke and having one of its ends pivotally connected to the lower end of one of the side pieces of the yoke, angularly-disposed portions on the opposite end of said strap and on the other cross-piece of the yoke, the portion on the strap having an open-ended slot, and a fastening device passing through said angularly-disposed portions.

In testimony whereof I hereunto affix my signature in the presence of two witnesses, this twenty fifth day of August 1910.

CHARLES G. ETTE.

Witnesses:
WALTER C. RAITHEL,
EDWARD SCHWIDDE.